US006719354B2

(12) United States Patent
Holt

(10) Patent No.: US 6,719,354 B2
(45) Date of Patent: Apr. 13, 2004

(54) PIVOTLESS AUTOMOTIVE HINGE

(75) Inventor: Laurence James Holt, Uxbridge (CA)

(73) Assignee: Multimatic, Inc., Markham (CA)

(*) Notice: Subject to any disclaimer, the term of this patent is extended or adjusted under 35 U.S.C. 154(b) by 0 days.

(21) Appl. No.: 09/781,892

(22) Filed: Feb. 9, 2001

(65) Prior Publication Data

US 2001/0013713 A1 Aug. 16, 2001

(30) Foreign Application Priority Data

Feb. 11, 2000 (CA) ........................................ 2298370

(51) Int. Cl.[7] ........................................ B60J 5/00
(52) U.S. Cl. ........................ 296/146.11; 16/225; 16/226
(58) Field of Search ........................ 296/146.11, 225, 296/202; 16/226, DIG. 13

(56) References Cited

U.S. PATENT DOCUMENTS 494,988 A * 4/1893 Libbey ........................ 16/226
3,881,303 A * 5/1975 Krafka et al. ................. 16/225
4,097,958 A * 7/1978 Van Dell ...................... 16/225
4,236,274 A * 12/1980 Omote et al. ................. 16/225
5,350,614 A 9/1994 Chase et al.
5,463,794 A * 11/1995 Erland ......................... 16/225
6,149,998 A * 11/2000 Hettinga .................. 156/308.4
6,175,989 B1 * 1/2001 Carpenter et al. ........ 16/225 X
6,334,235 B2 * 1/2002 Duperray et al. ............. 16/225

FOREIGN PATENT DOCUMENTS

| | | |
|---|---|---|
| DE | 2939265 A | 4/1981 |
| DE | 29608573 U | 8/1996 |
| DE | 29818171 U | 1/1999 |
| FR | 2577856 A | 8/1986 |
| FR | 2195995 A | 3/1994 |
| FR | 2695877 A | 3/1994 |

* cited by examiner

*Primary Examiner*—Jason Morrow
(74) *Attorney, Agent, or Firm*—Kramer & Amado, P.C.; Gordon J. Zimmerman, Esq.

(57) ABSTRACT

An automotive hinge facilitates substantially rotary motion of a closure panel relative to a fixed body structure by means of a single resilient member configured to carry all required structural and operational loadings.

16 Claims, 3 Drawing Sheets

PIVOTLESS AUTOMOTIVE HINGE

FIELD OF THE INVENTION

This invention applies to hinges, more particularly to automotive hinges, which facilitate motion of a closure panel relative to a fixed body structure, without the requirement of a pivot axis pin and other components related to simple kinematic rotary motion.

BACKGROUND TO THE INVENTION

The simple rotary motion of doors and other general closure panels, particularly those used in automotive applications, is normally controlled by one or more hinge assemblies that contain a pivot pin and associated bearing surfaces.

In residential applications, the configuration of door hinges has been generally standardized as two structural leaves (1) formed to capture a single pivot pin (15) inside a rolled bearing surface (16). Two or three of these hinges are utilized, with carefully aligned pivot axis, to structurally locate the door and facilitate its swinging motion.

Automotive closure panels use a wide range of kinematic motions to facilitate opening and closing, ranging from simple rotation, through linear travel to complex motions created by multi-link hinge systems. However, in all of these cases, some aspect of rotary motion is required and this is always facilitated by a type of axis pin and bearing surface. The majority of passenger car side doors utilize a single pivot system of two hinges creating a simple rotary motion. In their most simple form these hinges are generally configured to contain a body structural component (2), a closure panel structural component (3), a pivot pin (4) and two pivot bushings (5). The most significant drawbacks of this configuration are created by the pivot arrangement. The bushing area significantly limits the forces that can be transmitted by the hinge assembly. Additionally, it is the bushings that normally dictate limited durability performance, generally measured as the number of opening and closing cycles the system can withstand. Both the bushings and pivot pin are subjected to hostile environments during cycling that cause high wear that is manifested in loose fitting hinges and sloppy ill-fitting doors. Sophisticated bushings or bearings, used in conjunction with exotic pivot pin materials can be utilized to solve these problems but the associated costs are of significantly diminishing return.

SUMMARY OF THE INVENTION

Accordingly, it would be advantageous to create a hinge assembly that eliminates the requirement of a pivot pin and bearing area while still facilitating substantially rotary motion.

The present invention is targeted at reducing the complexity of rotary hinge systems while increasing both the load carrying capability and durability performance over conventional pivot pin and bushing arrangements.

In a principal aspect of the invention, an automotive hinge facilitates substantially rotary motion of a closure panel relative to a fixed body structure by means of a single resilient member configured to carry all required structural and operational loadings. In a further aspect, the automotive hinge comprises a vehicular closure panel; a body component adapted to be mounted to a vehicular body; with the resilient member adapted to be attached to both the closure panel component and the body component, such that the relative movement between the closure panel component and the body component is constrained by the resilient member to be substantially rotary and that all required closure panel loadings can be adequately transferred to the vehicular body.

In further aspects of the invention of the automotive hinge:

(a) the body component is configured to guide and structurally support the resilient member through the closure panel's range of motion;

(b) the closure panel component is configured to guide and structurally support the resilient member through the closure panel's range of motion;

(c) the resilient member is configured to produce a torque that aids the system in overcoming operational resistant;

(d) the body component and closure panel component both incorporate interlocking figures that restrain the system from translational movement in the fully closed position, to facilitate crash compliance and/or resist pull off loads caused by aerodynamic or other similar forces;

(e) the interlocking figure incorporates a retention clip that provides a compliant interface between the body component and closure panel component and generates a modest interference so that build variations are compensated for and operational friction is reduced;

(f) the resilient member is manufactured from high strength spring steel;

(g) the resilient member is manufactured from high strength composite material such as carbon fibre;

(h) the assembly is configures to function as an automotive side door hinge;

(i) the assembly is configured to function as an automotive front hood hinge;

(j) the assembly is configured to function as an automotive rear decklid hinge; and (k) the assembly is configured to function as an automotive rear liftgate hinge.

DETAILED DESCRIPTION OF THE INVENTION

Figure 1:
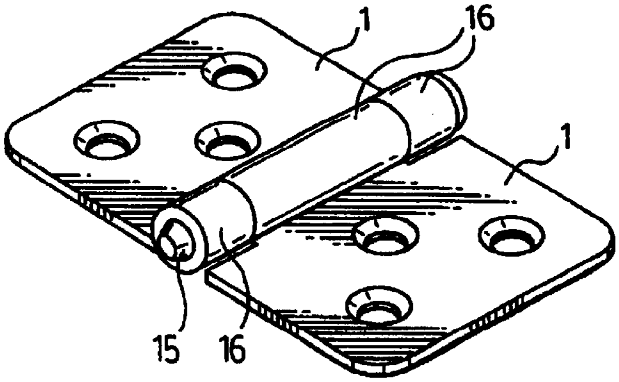
FIG.1. (PRIOR ART)
FIG. 1 is a perspective view of a typical prior art residential door hinge.
Figure 2:
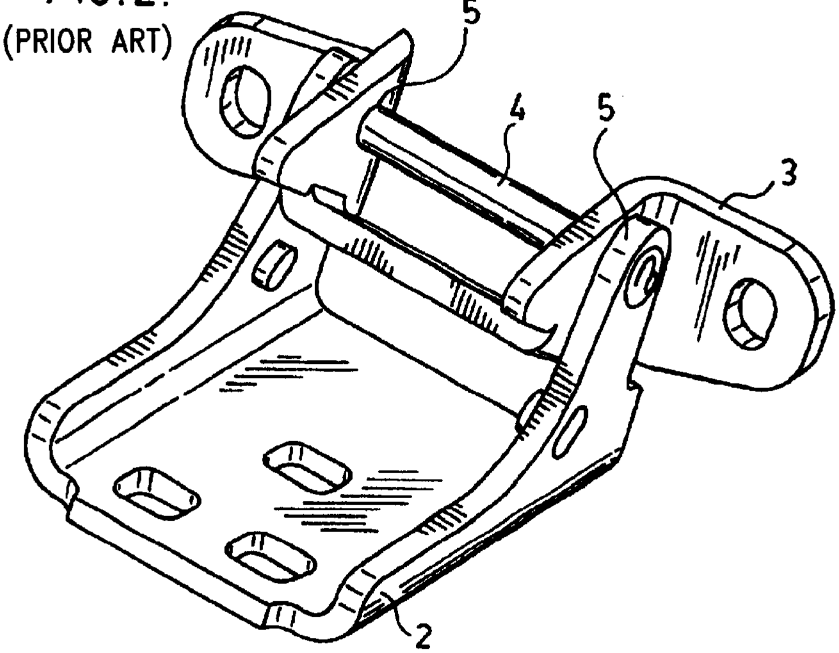
FIG.2. (PRIOR ART)
FIG. 2 is a perspective view of a typical prior art automotive side door hinge.
Figure 3:
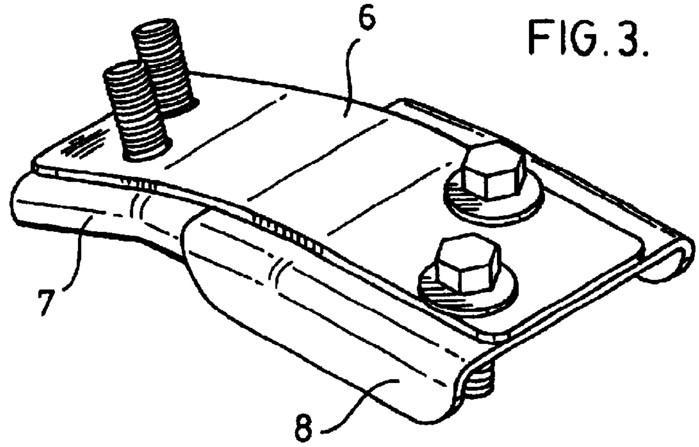
FIG. 3 is a perspective view of the inventive hinge assembly.
Figure 4:
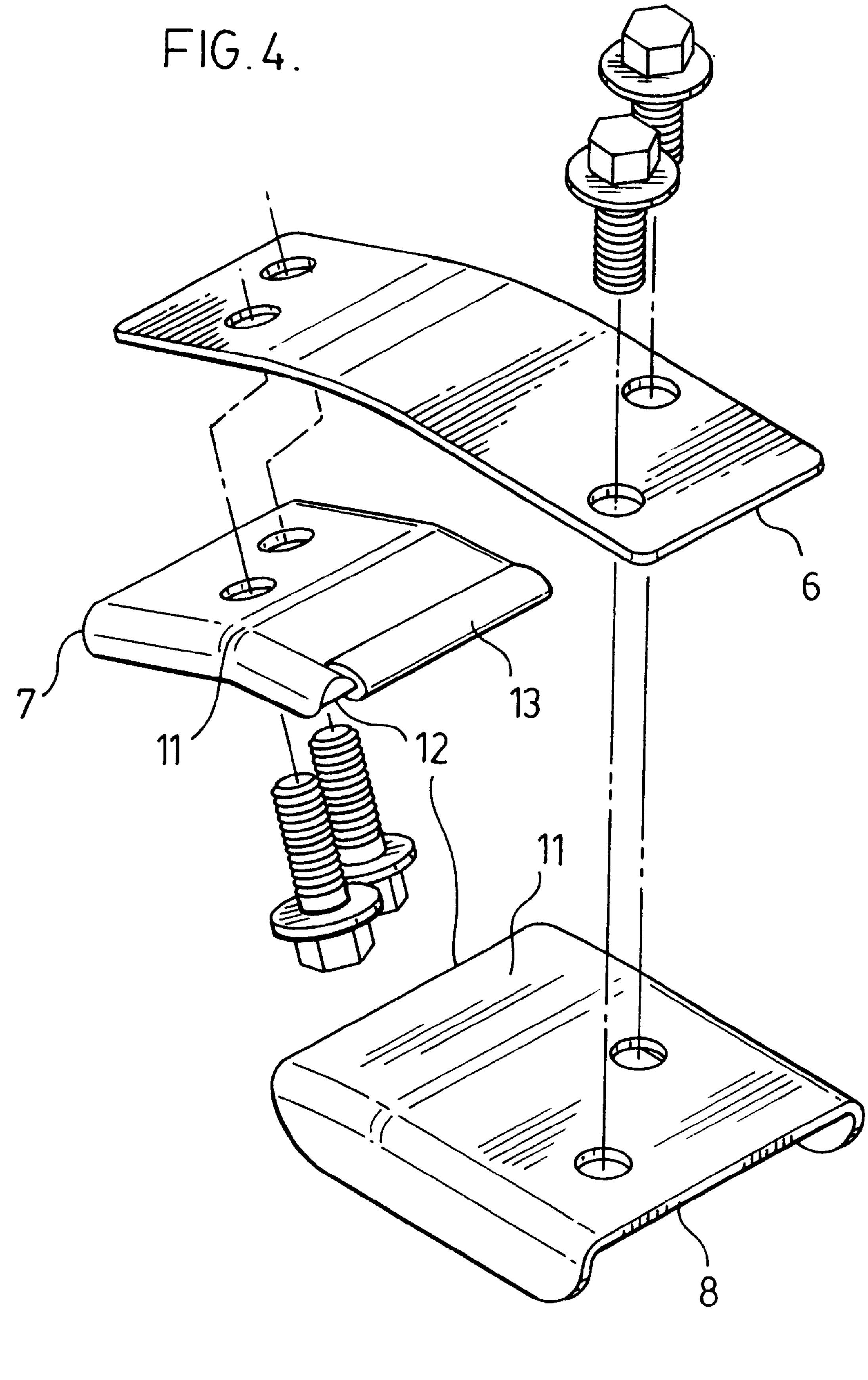
FIG. 4 is an exploded view of the components of the inventive hinge assembly.
Figure 5:
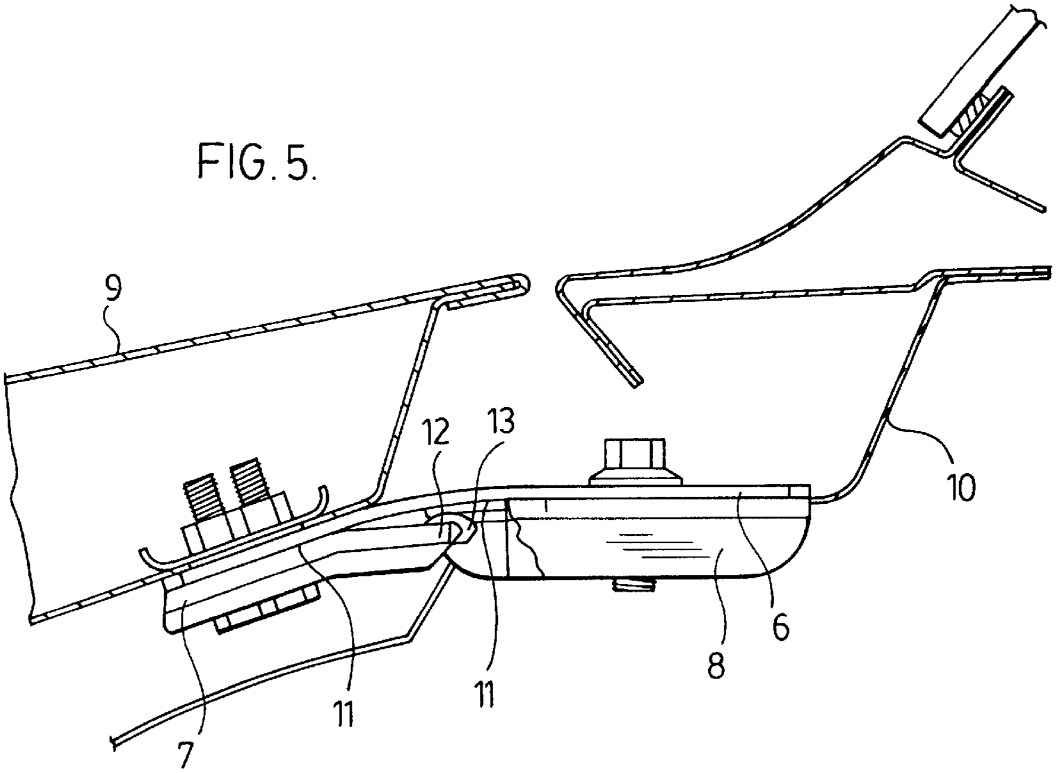
FIG. 5 is a fragmentary sectional view of a vehicular body and front hood panel embodying the inventive hinge assembly in a closed condition.
Figure 6:
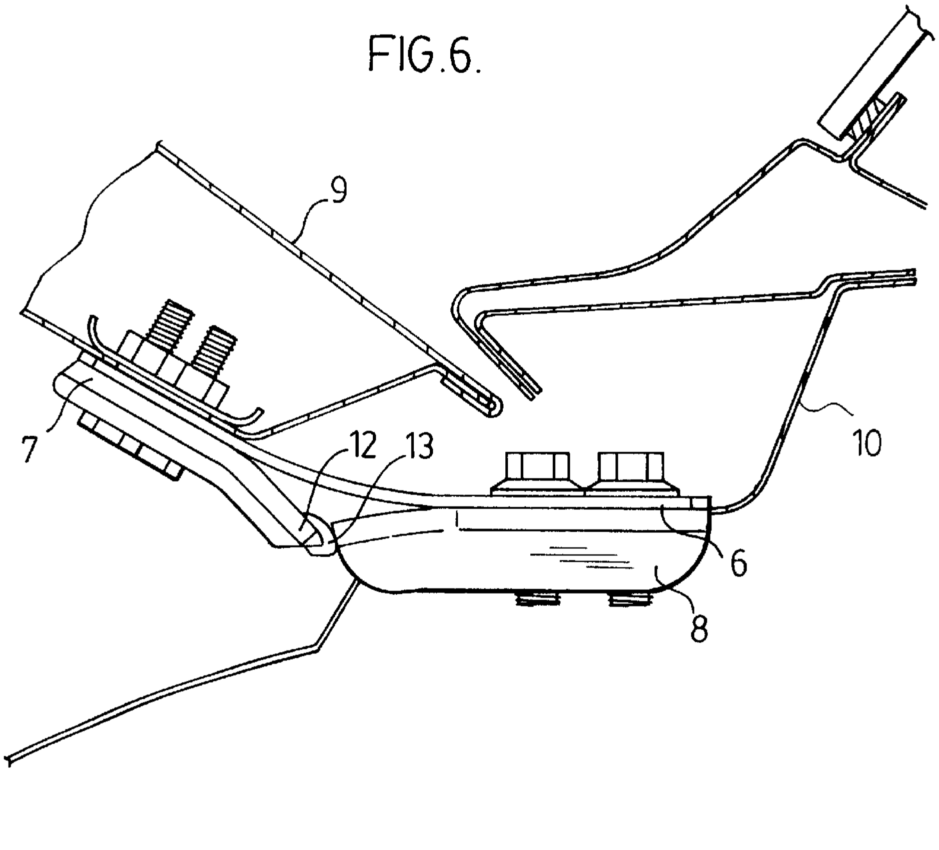
FIG. 6 is a fragmentary sectional view of a vehicular body and front hood panel embodying the inventive hinge assembly in an open condition.

A preferred embodiment of the invention will now be described with reference to the drawings.

A single resilient member (6) is configured to carry all required structural and operational loadings of the closure system while also providing a substantially rotary motion via simple straining of its constitutive material. The resilient member (6) is configured so that the stresses and strains induced in its constitutive material, by the full range of closure panel motion, never exceed the elastic limit. In this way, the resilient member is never subjected to permanent strain and always returns to its original nominal position without overall structural set.

The resilient member is adapted to be attached to both a closure panel component (7) and a body component (8) that aid in constraining the motion of the resilient member, structurally support it through its range of motion, facilitate mounting and structurally lock the hinge system as required in its closed position. The closure panel component (7) and body component (8) are not primary structural members in comparison to the prior art configuration that utilizes a body structural component (2) and a closure panel structural component (3), and as such are lighter, simpler and less costly to produce. The closure panel component is adapted to be mounted to a vehicular closure panel (9). The body component is adapted to be mounted to a vehicular body (10). Both components are configured with contact surfaces (11) that interface with the resilient member and guide its motion to be substantially rotary. Additionally, both components incorporate interlocking features (12) that restrain the system from translational movement in its full closed condition, to facilitate crash compliance and/or resist pull offloads caused by aerodynamic or other similar forces. The closure panel component or body component may also be configured to carry a retention clip (13) that enhances the function of the interlocking features by providing a compliant interface and generating a modest interference so that build variations are compensated for. This retention clip is manufactured from a plastic or relatively hard rubber compound.

The geometric configuration of the resilient member (6) and the material from which it is manufactured are the two most critical design parameters of the hinge assembly. The shape and thickness of the resilient member determine the induced strains and stresses for a given operational motion. The chosen material ultimately dictates that the resilient member functions within the elastic region and avoids permanent deformation. It has been established that a curved profile with either constant or varying thickness is the best geometric configuration for the resilient member. Both isotropic metallic materials like steel and anisotropic materials like Kevlar and carbon fibre have been successfully utilized to manufacture the resilient member. Fatigue resistance is a primary concern for the selection of this material and other materials have been found to be a poor choice because of this.

A further feature can be incorporated into the hinge system by configuring the geometric shape of the resilient member so that it generates a beneficial torque during operation. The resilient member generates a torque during rotation due to its inherent material stiffness and if properly configured this torque can be utilized to assist the system in lifting a closure panel (9) against the force of gravity or closing a door against a water/wind sealing load.

What is claimed is:

1. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member separate from the components adapted to be attached to at least one of the panel and body components;

wherein at least one component includes a contact surface that interfaces with the resilient member to guide and structurally support the resilient member through the closure panel's range of motion.

2. The automotive hinge assembly of claim 1, wherein the resilient member is configured to produce a torque that aids the system in overcoming operational resistance.

3. The automotive hinge assembly of claim 1, wherein the at least one body component and the at least one closure panel component incorporate interlocking features that restrain the assembly from translational movement in the vehicular closure panel's closed condition.

4. The automotive hinge assembly of claim 3, wherein the interlocking feature incorporates at least one retention clip that provides a compliant interface between the at least one body component and the at least one closure panel component and generates modest interference so that build variations are compensated for and operational friction is reduced.

5. The automotive hinge assembly of claim 1, wherein the resilient member is manufactured from high strength spring steel.

6. The automotive hinge assembly of claim 1, wherein the resilient member is manufactured from high strength composite material.

7. The automotive hinge assembly of claim 1, wherein the assembly is configured to function as an automotive side door hinge.

8. The automotive hinge assembly of claim 1, wherein the assembly is configured to function as an automotive front hood hinge.

9. The automotive hinge assembly of claim 1, wherein the assembly is configured to function as an automotive rear decklid hinge.

10. The automotive hinge assembly of claim 1, wherein the assembly is configured to function as an automotive rear liftgate hinge.

11. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein the resilient member is manufactured from high strength composite material.

12. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein at least one component includes a contact surface that interfaces with the resilient member to guide and structurally support the resilient member through the closure panel's range of motion; and wherein the resilient member is manufactured from high strength spring steel.

13. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein at least one component includes a contact surface that interfaces with the resilient member to guide and structurally support the resilient member through the closure panel's range of motion; and wherein the assembly is configured to function as an automotive front hood hinge.

14. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein at least one component includes a contact surface that interfaces with the resilient member to guide and structurally support the resilient member through the closure panel's range of motion; and wherein the assembly is configured to function as an automotive rear decklid hinge.

15. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein at least one component includes a contact surface that interfaces with the resilient member to guide and structurally support the resilient member through the closure panel's range of motion; and wherein the assembly is configured to function as an automotive rear liftgate hinge.

16. An automotive hinge assembly that facilitates substantially rotary motion of a closure panel relative to a fixed vehicular body comprising:

at least one closure panel component adapted to be mounted to a vehicular closure panel;

at least one body component adapted to be mounted to a vehicular body; and a resilient member adapted to be attached to at least one of the panel and body components;

wherein at least one component includes a contact surface that interfaces with the resilient member to guide and structurally support the resilient member through the closure panel's range of motion; and wherein the resilient member is manufactured from high strength composite material.

* * * * *